(12) United States Patent
Bordin et al.

(10) Patent No.: US 11,884,036 B2
(45) Date of Patent: Jan. 30, 2024

(54) MOULD AND METHOD FOR PRODUCING FOOTWEAR

(71) Applicant: STEMMA SRL, Cornuda (IT)

(72) Inventors: Ettore Bordin, Montebelluna (IT); Stefano Pellizzari, Montebelluna (IT)

(73) Assignee: STEMMA SRL, Cornuda (IT)

( * ) Notice: Subject to any disclaimer, the term of this patent is extended or adjusted under 35 U.S.C. 154(b) by 988 days.

(21) Appl. No.: 16/648,489

(22) PCT Filed: Sep. 25, 2018

(86) PCT No.: PCT/IB2018/057387
§ 371 (c)(1),
(2) Date: Mar. 18, 2020

(87) PCT Pub. No.: WO2019/064170
PCT Pub. Date: Apr. 4, 2019

(65) Prior Publication Data
US 2020/0223167 A1 Jul. 16, 2020

(30) Foreign Application Priority Data

Sep. 27, 2017 (IT) .......................... 102017000108402

(51) Int. Cl.
*B29D 35/00* (2010.01)
*A43B 13/12* (2006.01)
(Continued)

(52) U.S. Cl.
CPC ........ *B29D 35/0018* (2013.01); *A43B 13/127* (2013.01); *B29C 2045/1687* (2013.01);
(Continued)

(58) Field of Classification Search
CPC .............. B29D 35/0018; B29D 35/061; B29D 35/082; B29D 35/142; B29D 35/148;
(Continued)

(56) References Cited

U.S. PATENT DOCUMENTS 4,149,696 A    4/1979  Koch et al.
2021/0120919 A1*  4/2021  Scolaro ................ B29D 35/082

FOREIGN PATENT DOCUMENTS

DE    3910419 A1 *  10/1990
DE    3910419 A1     10/1990
(Continued)

OTHER PUBLICATIONS

PCT International Search Report and Written Opinion dated Jan. 7, 2019 for Intl. App. No. PCT/IB2018/057387, from which the instant application is based, 12 pgs.

*Primary Examiner* — Jerzi H Moreno Hernandez
(74) *Attorney, Agent, or Firm* — FREDRIKSON & BYRON, P.A.

(57) ABSTRACT

A mould for producing footwear by direct injection onto an upper of a sole, including a tread and a midsole, wherein the midsole is composed of a first layer and a second layer. The mould includes a base, a pair of first half-rings, a lid, a pair of second half-rings and a mould last. The first half-rings are designed to be arranged close together such that they abut against the base and against the lid, so as to form a first mould cavity for moulding the first layer (6) of the midsole. While the first half-rings are abutting against the base, the second half-rings are designed to be arranged close together, such that they lie over the half-rings and abut against the upper, fitted onto the mould last, so as to form a second mould cavity for moulding the second layer of the midsole. The first half-rings are provided with guiding means so that they can be moved away from and towards each other and rotate about an axis of rotation. Also a method for producing footwear by direct injection onto an upper, which may be performed by means of the mould.

20 Claims, 18 Drawing Sheets

(51) Int. Cl.
    *B29C 45/16*     (2006.01)
    *B29D 35/14*     (2010.01)
    *B29L 31/50*     (2006.01)
    *B29D 35/06*     (2010.01)
    *B29D 35/08*     (2010.01)

(52) U.S. Cl.
    CPC .......... *B29D 35/061* (2013.01); *B29D 35/082* (2013.01); *B29D 35/142* (2013.01); *B29L 2031/504* (2013.01)

(58) Field of Classification Search
    CPC ...... B29D 35/081; B29D 35/10; B29D 35/08; B29D 35/14; A43B 13/12; A43B 13/127; B29L 2031/504
    See application file for complete search history.

(56) References Cited

FOREIGN PATENT DOCUMENTS

| | | |
|---|---|---|
| DE | 4129361 A1 | 7/1992 |
| EP | 0407688 A2 | 1/1991 |
| EP | 3113940 A2 | 1/2017 |
| FR | 2633810 A1 | 1/1990 |
| GB | 1197571 A | 7/1970 |

\* cited by examiner

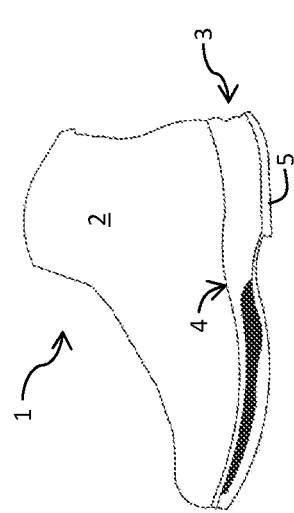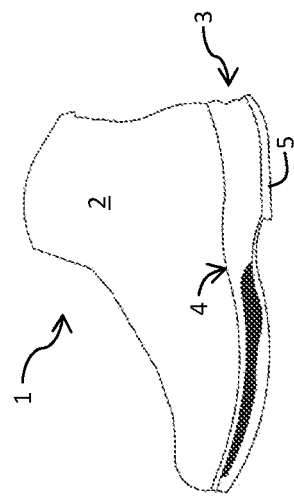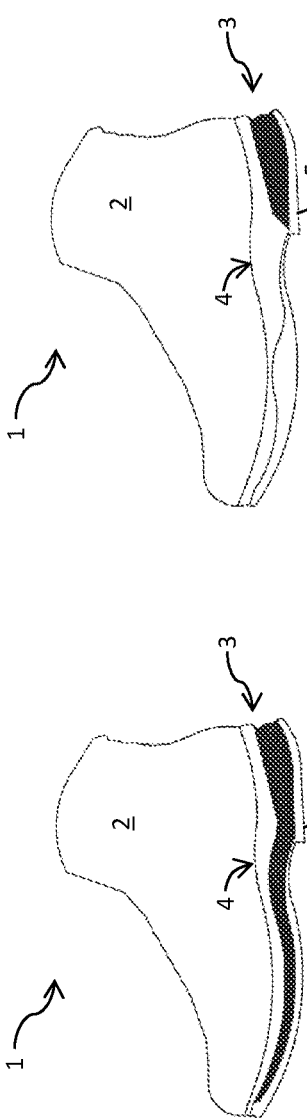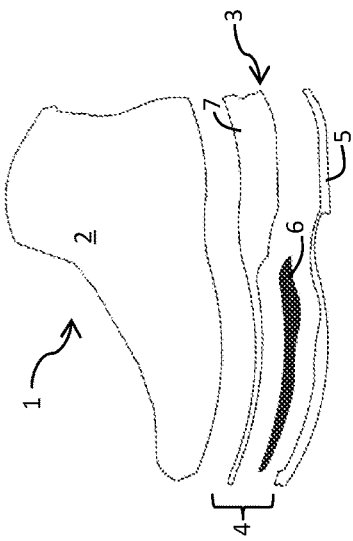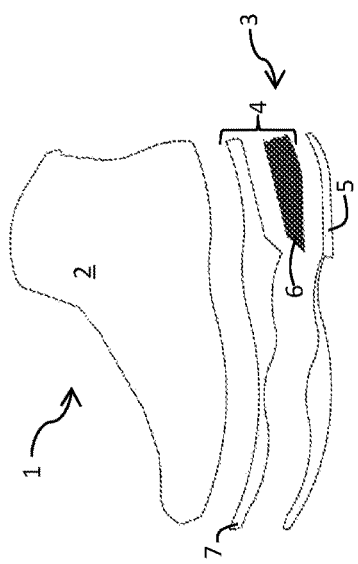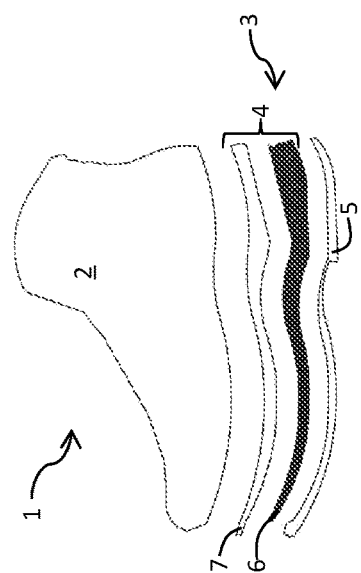

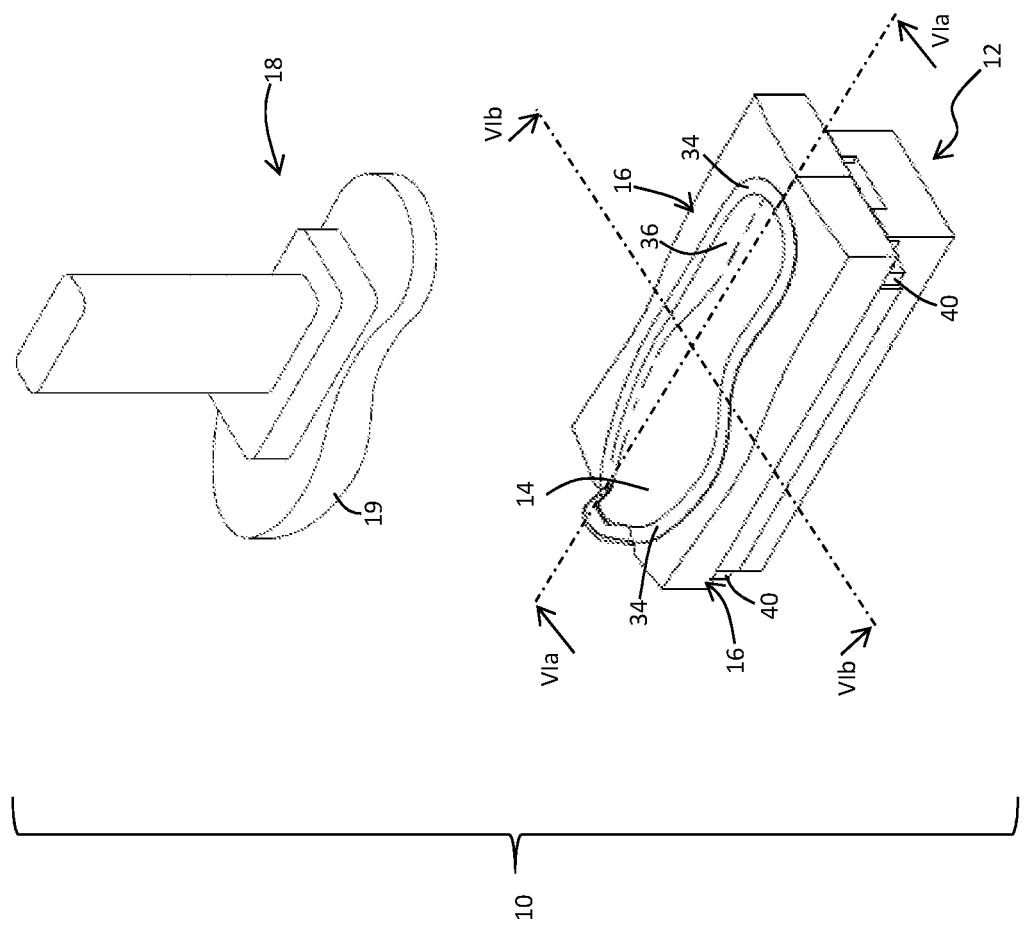

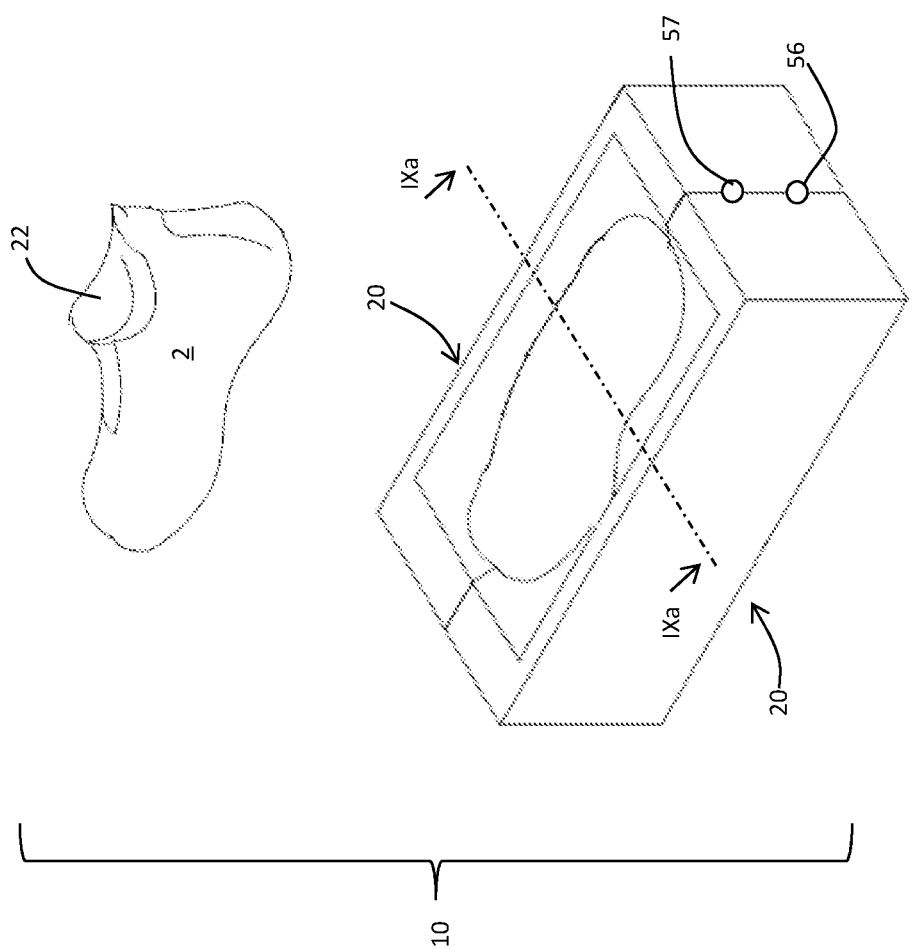

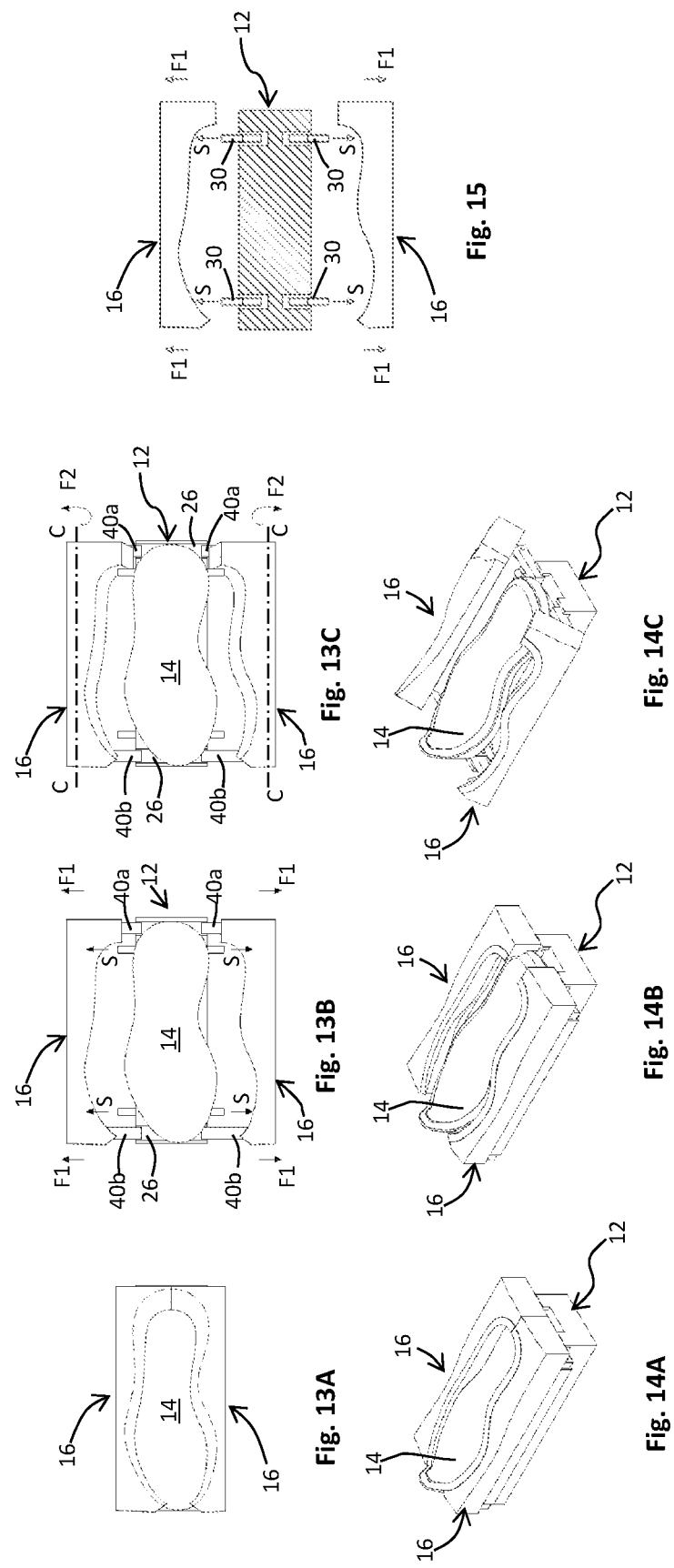

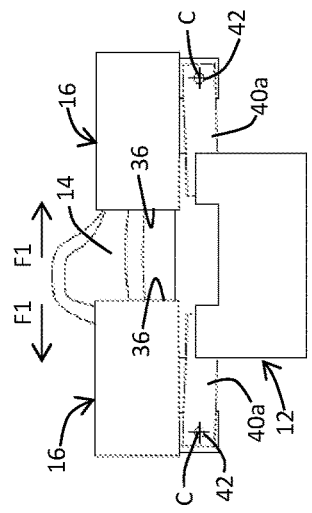
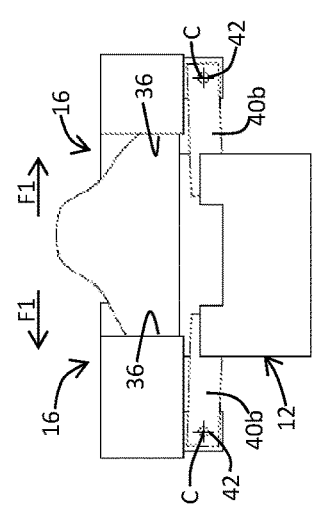
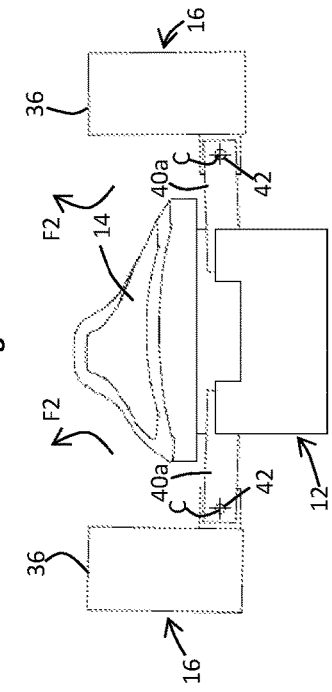
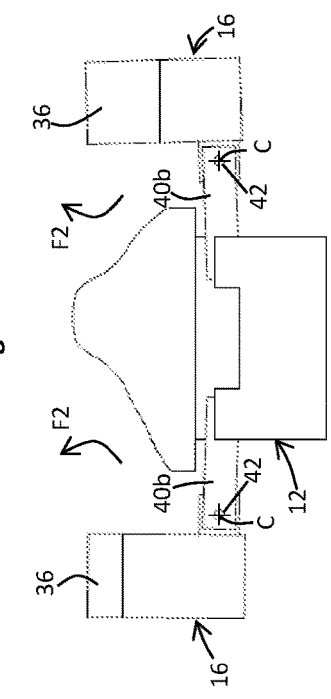
Fig. 15A  Fig. 15B  Fig. 15C  Fig. 15D  Fig. 15E  Fig. 15F

MOULD AND METHOD FOR PRODUCING FOOTWEAR

RELATED APPLICATIONS

This application is a 35 U.S.C. 371 national stage filing from International Application No. PCT/IB2018/057387, filed Sep. 25, 2018, which claims priority to Italian Application No. 102017000108402, filed Sep. 27, 2017, the teachings of which are incorporated herein by reference.

FIELD OF THE INVENTION

The present invention relates to a mould and a method for producing footwear. In particular, the present invention relates to a mould and a method for producing footwear with multi-layer soles by means of direct injection onto the upper.

BACKGROUND

It is known to manufacture, by means of a method involving direct injection onto an upper, footwear which have a sole formed by three different layers.

Examples of such footwear 1 are schematically shown in FIGS. 1-3.

In such type of footwear 1 the sole 3 generally comprises a tread 5, preferably made of rubber or thermoplastic polyurethane (TPU), and a midsole 4, usually made of polyurethane, preferably of the expanded type.

The midsole 4, in turn, as schematically shown in FIGS. 1A, 2A and 3A, may comprise a first layer 6 and a second layer 7 which, in addition to having different shapes and dimensions, may be made in different colours and using different materials depending on the required appearance and mechanical properties of the sole.

Various moulding methods for manufacturing the footwear shown in FIGS. 1-3 are known.

According to a first method an article composed of the tread 5 and the first layer 6 of the midsole 4 is made separately by means of a first mould.

In this case the tread 5 may be made of rubber or TPU and the first layer 6 of the midsole is preferably made of polyurethane.

This article is then loaded inside a second mould, composed of a base, a pair of half-rings and a mould last, onto which the upper 2 of the footwear is fitted.

This second mould is preferably mounted on a mould-holder station of a rotating or static machine.

The half-rings are intended to be closed with their bottom edge onto the base of the mould and with their top edge against the upper 2, which is fitted on the mould last, so as to delimit a mould cavity having a form and dimensions the same as those of the second layer 7 of the midsole 4.

The polymeric material is then injected inside this cavity so as to form the second layer 7 and complete the sole 3.

This method involves a not insignificant cost for acquiring or producing the article composed of the tread 5 and the first layer 6 of the midsole.

Moreover, in order to ensure adhesion between this article and the polyurethane material subsequently injected to complete the sole, it is necessary for the top surface of the article, which is intended to come into contact with the second layer 7, to be specially treated by means of the application of glues or by means of a carding operation.

A second moulding method is described in EP 0407688.

This document describes a mould composed of a base, a first pair of half-rings, a second pair of half-rings and a mould last.

Initially the two first half-rings are arranged so as to abut against the bottom part of the upper 2 fitted onto the mould last so as to define a closed cavity having a form and dimensions the same as those of the second layer 7 of the midsole 4.

Once the polymeric material forming the layer 7 of the midsole has been injected, the two half-rings are widened and the mould last, together with the upper on which the second layer 7 is fixed, is lowered so as to allow them to be positioned between the second pair of half-rings.

The tread 5 is moulded separately and is then loaded into the mould base which, in combination with the second pair of half-rings and the mould last, is designed to define a second cavity having a form and dimensions the same as those of the first layer 6 of the midsole 4.

A second polymeric material is then injected inside this cavity so as to form the first layer 6 and complete the sole 3.

The mould described in EP 0407688 is not without drawbacks.

This mould, in fact, must be mounted on a dedicated moulding machine in which, unlike conventional machines, the first injection operation for forming the second layer 7 is performed at a height higher than that of the second injection operation for forming the first layer 6.

The mould last moreover must be moved into two different positions (for injection of the second layer 7 and injection of the first layer 6) instead of remaining immobile in a single position as in conventional machines. In order to arrange the last in the two different injection positions the machine must be provided with a special movement and control system which is usually not available in conventional systems.

The mould described in EP 0407688 may therefore not be used in conventional rotating machines which are available at most manufacturers.

The method and the mould described in EP 0407688 may moreover be used to produce soles of the type shown in FIG. 1, but not soles of the type indicated in FIG. 2 and FIG. 3 since it would not be possible to obtain adhesion between the tread 5 and the second layer 7.

The two parts in fact would come into contact with each other after the polymerization reaction of the material of the second layer 7 has terminated. This material, which has now solidified, is no longer able to adhere to the tread 5.

The sole produced with the method and the mould described in EP 0407688 will moreover have an injection sprue at the second layer 7 which must therefore be removed manually, leaving an unattractive injection imprint on the outer surface of the sole. This system in fact does not envisage an automatic system for removal of the injection sprue.

The object of the present invention therefore is that of overcoming the drawbacks mentioned above with reference to the prior art.

Brief Summaries of Objects of the Invention

A first task of the present invention is to provide a mould for producing footwear with multi-layer soles by direct injection onto an upper which has a simplified structure compared to the known art.

A second task of the present invention is to provide a mould for producing footwear with multi-layer soles by direct injection onto an upper, which may be used in combination with moulding machines of the conventional type without the need for structural modifications.

A further task of the present invention is to provide a method for producing footwear with multi-layer soles by direct injection onto an upper which is advantageous in terms of cost and efficiency compared to the known methods.

Finally, a task of the present invention is to provide a method for producing footwear with multi-layer soles by direct injection onto an upper, which allows footwear to be produced without unattractive marks on the sole.

The object and the main tasks described above are achieved with a mould according to claim 1 and a method according to claim 13.

BRIEF DESCRIPTIONS OF THE DRAWINGS

The characteristic features and further advantages of the invention will emerge from the description, provided hereinbelow, of a number of embodiment examples, provided by way of a non-limiting example, with reference to the accompanying drawings in which:

FIGS. 1-3 show in schematic form sides view of footwear which can be obtained with the mould and method according to the invention;

FIGS. 1A-3A show respectively exploded views of FIGS. 1-3;

FIG. 6 shows a simplified exploded view of the mould according to the invention in a first operative configuration;

FIG. 9 shows a simplified exploded view of the mould according to the invention in a second operative configuration;

FIGS. 13A, 13B, 13C show respectively views similar to those of FIGS. 10A, 10B, 10C, but relating to a second embodiment of the mould according to the invention;

FIGS. 14A, 14B, 14C are respectively prospective views of FIGS. 13A, 13B and 13C;

FIG. 15 shows a view similar to that of FIG. 12, but relating to a second embodiment of the mould according to the invention;

FIGS. 15A, 15B and 15C show respectively front views of FIGS. 14A, 14B and 14C;

FIGS. 15D, 15E and 15F show respectively rear views of FIGS. 15A, 15B and 15C;

DETAILED DESCRIPTION OF EMBODIMENTS OF THE INVENTION

Figures 4, 5:
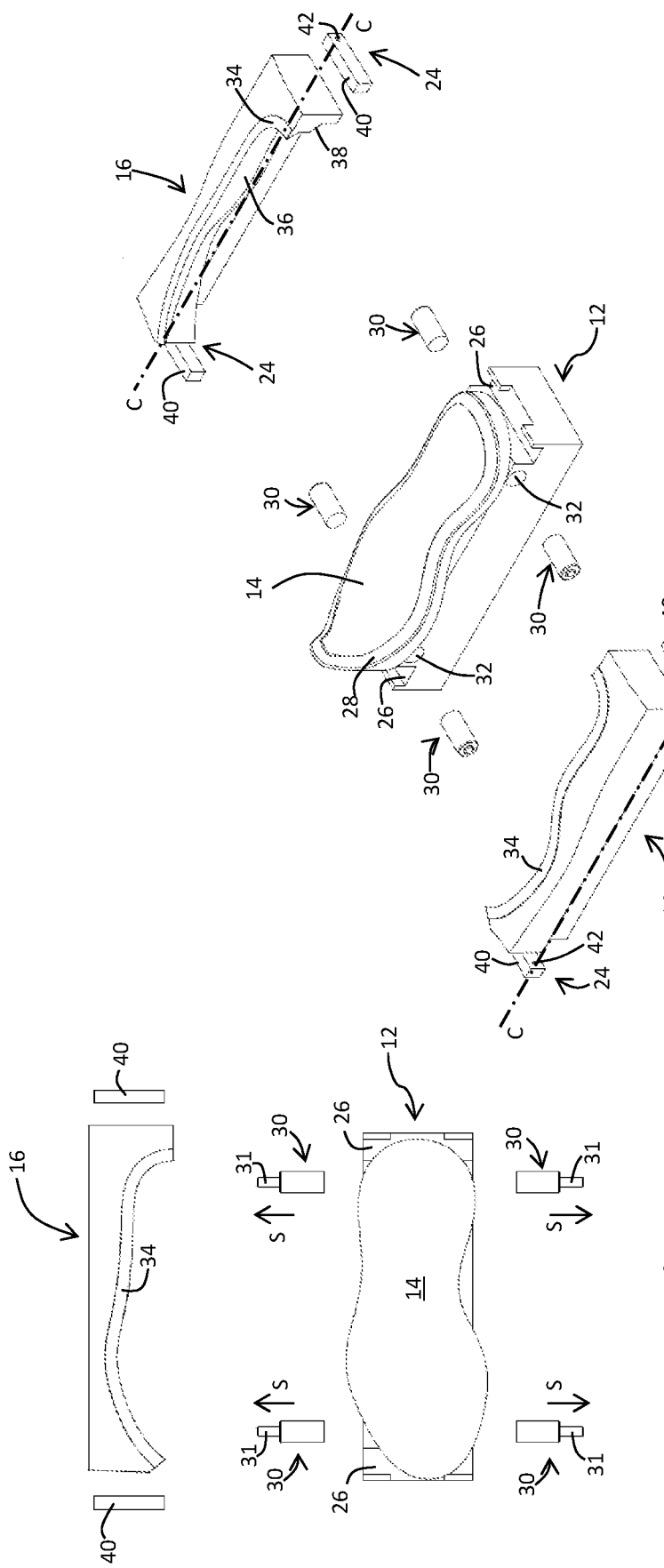
FIGS. 4 and 5 show respectively a perspective view and an exploded top plan view of a base and a pair of first half-rings of the mould according to the invention.

With reference firstly to FIGS. 6 and 9, a mould provided in accordance with the principles of the present invention is indicated overall by the number 10.

This mould 10 is designed to be used to manufacture a shoe 1 by means of direct injection onto an upper 2 of a sole 3, comprising a tread 5 and a midsole 4, in which the midsole 4 is composed of a first layer 6 and a second layer 7 (see FIGS. 1-3 and 1A-3A).

Preferably, the tread 5 is made of rubber or thermoplastic polyurethane (TPU), while the first layer 6 and the second layer 7 of the midsole 4 are generally made of expanded or compact polyurethane.

The mould 10 is intended to be mounted in a mould-holder station of a moulding machine of the type commonly used to manufacture footwear by means of direct injection onto an upper.

The mould-holder station comprises in a known manner a support, a mould-holder drawer and a mould last support and/or lid support assembly.

This type of machine, since it is well-known to the person skilled in the art, is not shown in the attached figures.

The mould 10 comprises a base 12, a pair of first half-rings 16 and a lid 18 (see FIG. 6). The mould 10 comprises moreover a pair of second half-rings 20 and a mould last 22 (see FIG. 9).

Figure 6A:
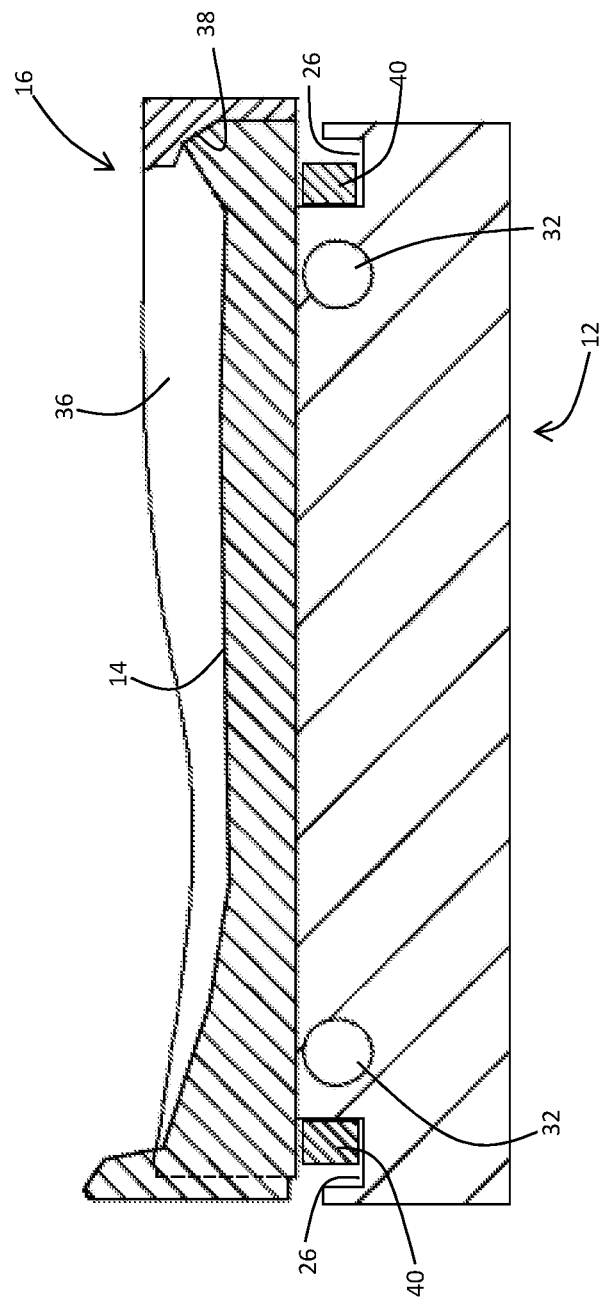
FIG. 6A shows a schematic cross-sectional view of the base of the mould according to FIG. 6 along the plane indicated by VIa-VIa.
Figure 6B:
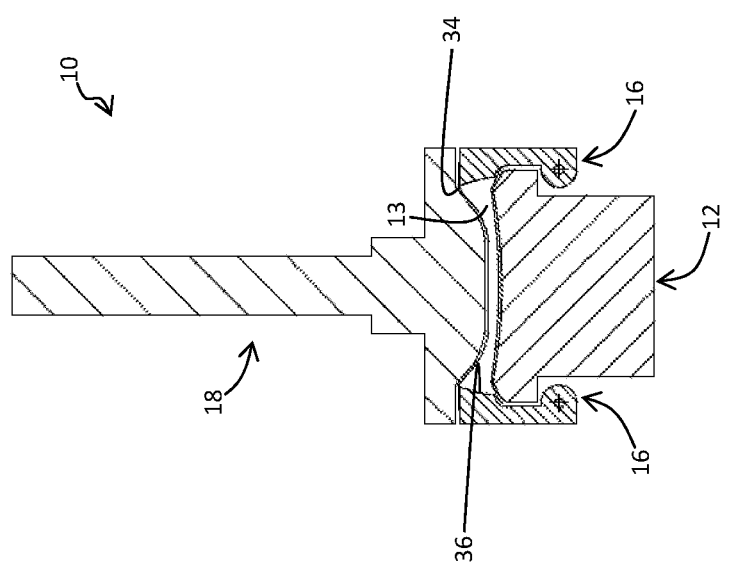
FIG. 6B shows a schematic cross-sectional view of the base of the mould according to FIG. 6 along the plane indicated by VIb-VIb, with the lid in contact with the first half-rings.
Figure 7:
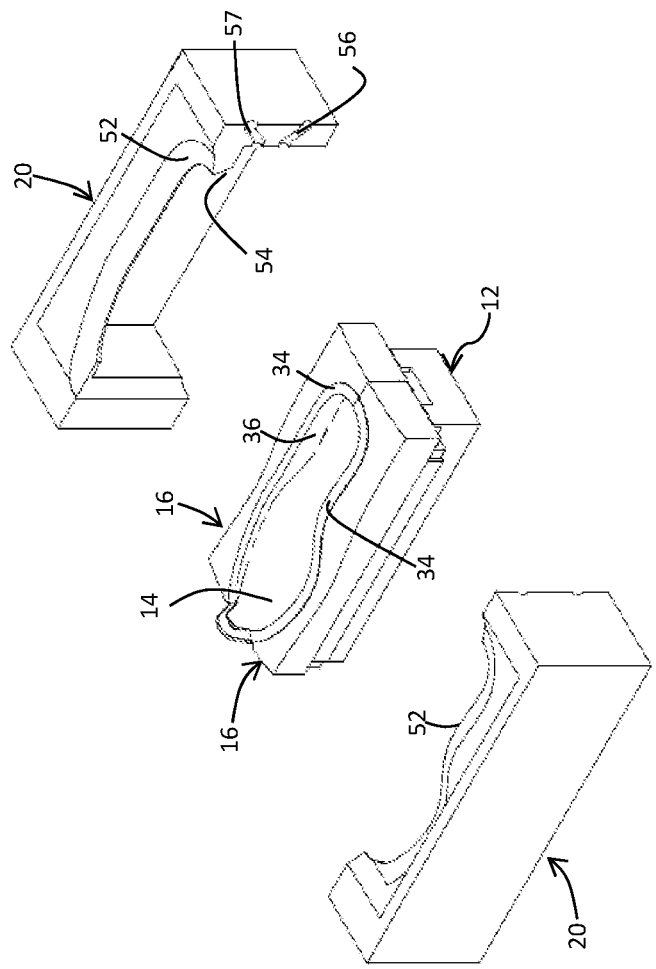
FIGS. 7 and 8 show views similar to those of FIGS. 4 and 5, but relating to further components of the mould according to the invention.
Figure 8:
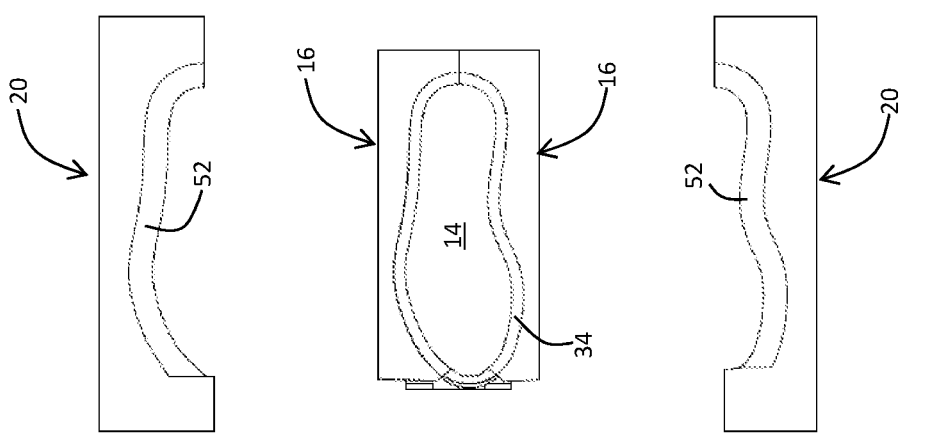

The first half-rings 16 are designed to be arranged close together such that they abut against the base 12 and against the lid 18, so as to form a first mould cavity 13 for moulding the first layer 6 of the midsole 4 (see FIG. 6*b*).

Figure 9A:
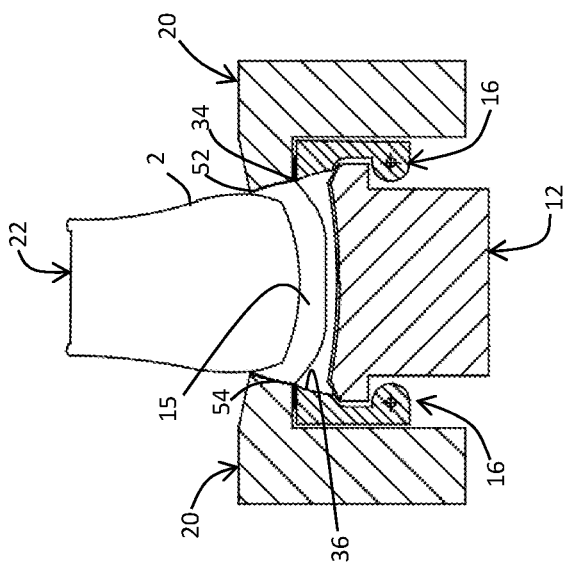
FIG. 9A shows a schematic cross-sectional view of the mould according to FIG. 9 along the plane indicated by IXa-IXa, with the mould last in contact with the second half-rings.

While the first half-rings 16 are abutting against the base 12, the second half-rings 20 are designed to be arranged close together such that they lie over the first half-rings 16 and abut against the upper 2, which is fitted on the mould last 22, so as to define a second mould cavity 15 for moulding the second layer 7 of the midsole 4 (see FIG. 9*a*).

In accordance with the invention, the first half-rings 16 are provided with guiding means 24 designed to slidably engage with corresponding guiding means 26 provided in the base 12 so as to allow the first half-rings 16 to be moved away from and towards each other.

Moreover the first half-rings 16 are hinged at the bottom with said guiding means 24 so as to be able to rotate about an axis of rotation C (see FIGS. 4 and 5). Preferably this axis of rotation C is a horizontal rotation axis. Advantageously, this axis of rotation C may be an axis of rotation parallel to the support of the mould-holder station on which the base 12 is placed.

As will become clear from the continuation of the description, the mould 10 according to the present invention advantageously allows the first layer 6 and the second layer 7 of the midsole 4 to be formed without having to replace the first half-rings 16.

The first half-rings 16, in fact, owing to the arrangement of the guiding means 24, may be easily moved away from the base 12, allowing easy access to the base 12 and allowing also, at the end of the various moulding steps, easy removal of the shoe 1 from the mould 10.

At the same time, as will become clear from the description below, owing to the rotation relative to the axis C, it is possible to reduce the amplitude of the movements of the first half-rings 16 relative to the base 12.

In this way it is possible to mount both the first half-rings 16 and the second half-rings 20 inside the same mould-holder drawer of the mould-holder station, without having to make structural modifications to the machine.

Finally, the first half-rings 16 and the second half-rings 20 may be moved manually or by means of actuators of the known type, for example electric, pneumatic or spring actuators. It is therefore possible to mount the mould 10 on moulding machines of the conventional type, without the need to carry out structural modifications of the mould-holder station.

Below the single components of the mould 10 according to the invention are described in detail.

The base 12 of the mould 10, in a known manner, may be fixed to the support of the mould-holder station of the moulding machine and may be moved along a direction perpendicular to its own direction of extension by means of known linear actuators.

Advantageously the base 12 of the mould may be moved using a double upward movement, a so-called double wedge upward movement which, as will be explained in detail below, allows a profile with a regular burr to be created between the base 12 and the first half-rings 16 and between the first half-rings 16 and the second half-rings 20. This movement moreover allows articles to be obtained where there is no unattractive marking of the injection sprue.

With reference to FIG. 4, the base 12 is preferably provided with an impression 14 shaped according to the tread 5 of the sole 3.

Advantageously this impression 14 is intended to house the tread 5 of the sole 3.

As will be described below, the tread 5 preferably is moulded separately, using a separate mould (not shown in the figures), and then loaded inside the base 12.

The base 12 may advantageously comprise a perimeter edge 28 which is designed to delimit the impression 14.

As already mentioned, the base 12 is provided with guiding means 26 which have the function of cooperating with the guiding means 24 of the pair of first half-rings 16.

Preferably, these guiding means 26 are provided on a front portion and/or a rear portion of the base 12 (see FIG. 4).

They may comprise one or more, preferably rectilinear, guide grooves 26 which are intended to be slidably engaged by the corresponding guiding means 24 of the first half-rings 16.

Alternatively, the guide grooves 26 may be curved.

In a different embodiment the guiding means 26 of the base 12 may consist of suitably shaped guiding rings or shoes.

As shown in FIGS. 4 and 5, the guide grooves 26 may extend along a direction perpendicular to the direction of extension of the base 12.

The base 12 may comprise, moreover, spacing means 30. These spacing means 30 have the function of facilitating the opening of the first half-rings 16 when the latter abut against the base 12.

The spacing means 30 preferably comprise one or more telescopic cylinders, preferably concealingly housed inside seats 32 formed in the bottom portion of the base (see FIGS. 4 and 6*a*).

Figure 12:
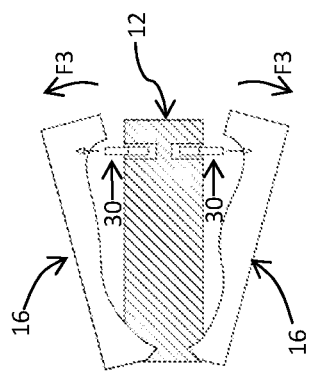
FIG. 12 shows a view from above, partially cross-sectioned, of the components of the mould shown in FIGS. 4 and 5.

Advantageously these cylinders may be pneumatically or mechanically operated so that one of their ends 31 exerts a thrust S against the facing inner surface of the first half-rings 16, when the half-rings 16 are abutting against the base 12, so as to facilitate separation thereof (see FIGS. 5, 12 and 15).

The first half-rings 16, together with the base 12, are mounted on the mould-holder drawer of the mould-holder station.

As clearly shown in FIGS. 4, 5, 6 and 6*a*, each half-ring 16 preferably has a top closing edge 34 designed to abut against the sides or the bottom edges 19 of the lid 18, and a lateral impression 36 having dimensions and a finish corresponding to half of the first layer 6 of the midsole.

Each half-ring 16 is moreover provided with a bottom closing edge 38 designed to abut against the perimeter edge 28 of the base 12, when the two half-rings 16 are arranged close together.

In detail, the first mould cavity 13, which is formed for moulding of the first layer 6 of the midsole 4, is therefore delimited at the bottom by the impression of the base 12, on which a separately moulded tread 5 may be loaded if necessary, laterally by the two first half-rings 16 and at the top by the lid 18 (see FIG. 6*b*).

As already mentioned the two half-rings 16 comprise guiding means 24 designed to slidably engage with corresponding guiding means 26 provided in the base 12. Advantageously said guiding means 24 may slide inside the guiding means 26 of the base 12, remaining in a horizontal plane, substantially parallel to the plane of the base 12.

Preferably the guiding means 24 of each first half-ring 16 comprise at least one guiding appendage 40 designed to engage slidably with a corresponding guide groove 26 in the base 12.

In accordance with the embodiments shown in FIGS. 10A-10C, 11A-11C, 12A-12F, each first half-ring 16 is provided with a rear guiding appendage 40*a*. In accordance with the embodiments shown in FIGS. 13A-13C, 14A-14C, 15A-15F, each first half-ring 16 is provided with a rear guiding appendage 40*a* and a front guiding appendage 40*b*.

Figure 14D:
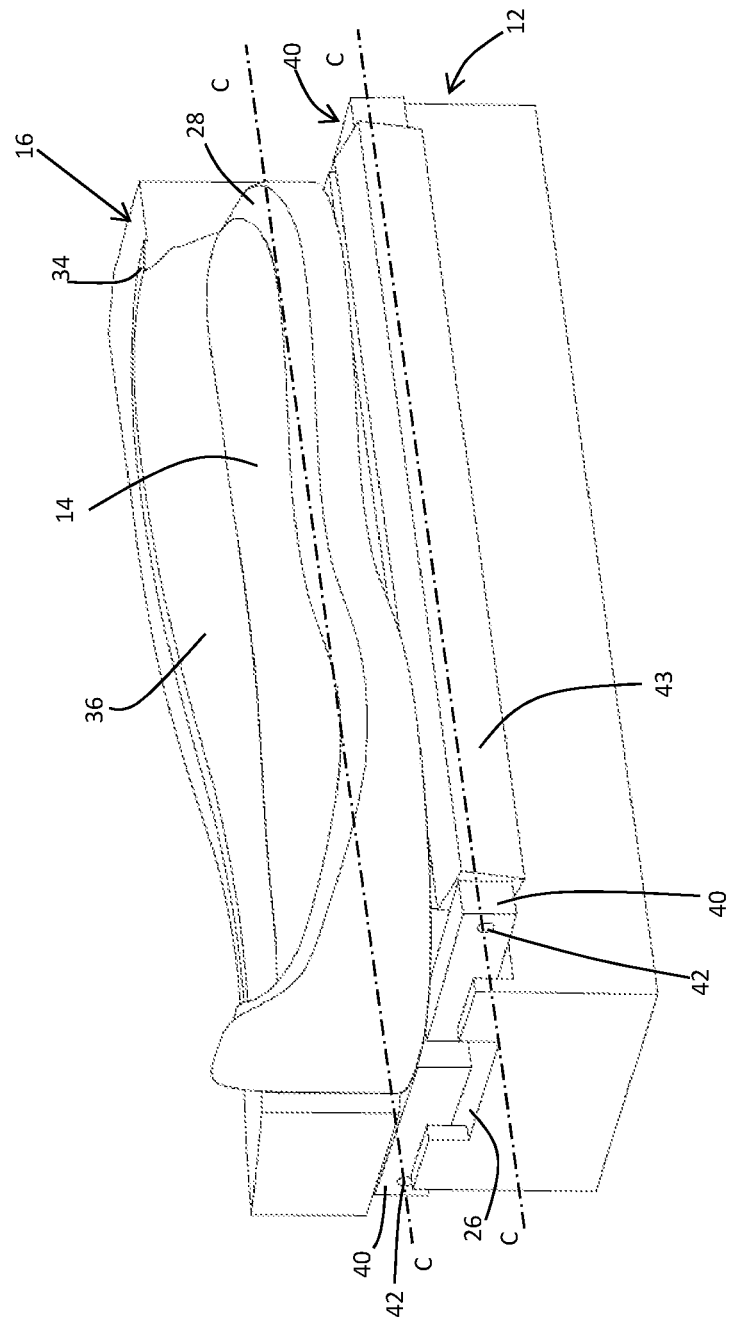
FIG. 14D is a simplified perspective view of the components of the mould shown in FIGS. 13A and 14A, in which one of the two first half-rings has been removed.

Advantageously, the guiding means 24 comprise the guiding appendage 40 and a hinge 42, the axis of rotation of which coincides with the axis of rotation C (see FIGS. 4 and 14D).

Preferably, each first half-ring 16 is hinged at the bottom with the guiding appendage 40 by means of the hinge 42.

Advantageously, each hinge 42 connects rotatably the guiding appendage 40 to a bottom appendage 43 of each half-ring 16.

The arrangement of the guiding appendage 40 and the hinge 42 advantageously allows each first half-ring 16, after it has been moved away from the base 12, to rotate about the axis of rotation C, moving from a horizontal plane, in which it is substantially parallel to the base 12, to a plane which is inclined or vertical with respect to the base 12.

In detail, in accordance with the embodiment shown in FIGS. 13A-13C, 14A-14D, 15A-15F, the two first half-rings 16 may, in fact, first be moved away from the base 12, following sliding of each guiding appendage 40 inside the guide grooves 26, along the direction indicated by the arrows F1 (see FIGS. 13B, 15B and 15E). This movement may be facilitated by the thrust S exerted by the spacing means 30 located in the vicinity of a front portion and a rear portion of the base 12 (see FIG. 15).

In this embodiment, the cross-section of each guiding appendage 40 coincides preferably with the cross-section of the corresponding guide groove 26 so as to create a form-fit which prevents any relative rotation of the appendage 40 and the groove 26.

Then the two first half-rings 16 may be rotated by means of the hinges 42 about the axis of rotation C, along the direction indicated by the arrows F2, until a position inclined or perpendicular to the base is assumed (see FIGS. 13C, 15C and 15F).

As already stated, the movements of the first half-rings 16 mentioned above may be advantageously performed manually.

Each first half-ring 16 may be provided at its rear end with a special grip handle (not shown in the attached figures).

Figure 10C:
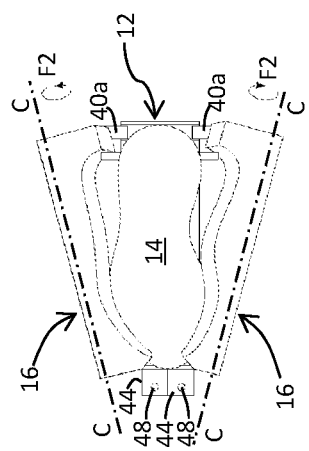
FIGS. 10A, 10B, 10C show in schematic form top plan views of the movements which can be performed by the mould components shown in FIGS. 4 and 5.
Figure 10B:
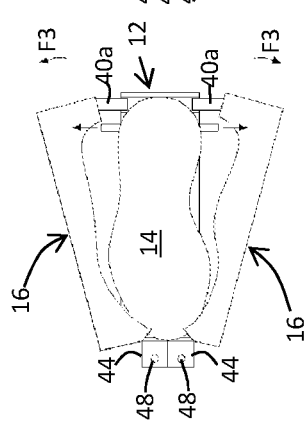
Figure 10A:
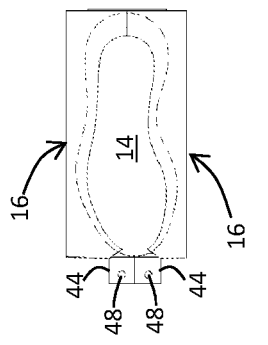
Figure 11C:
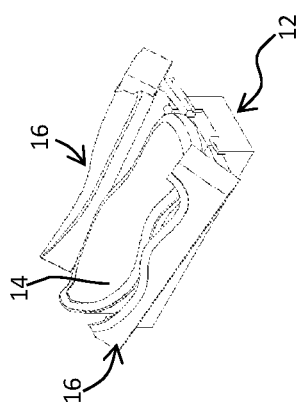
FIGS. 11A, 11B, 11C are respectively perspective views of FIGS. 10A, 10B and 10C.
Figure 11B:
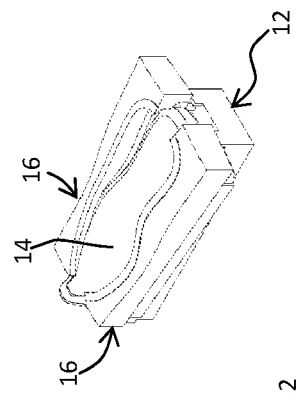
Figure 11A:
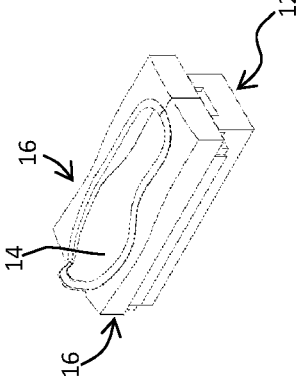
Figure 11D:
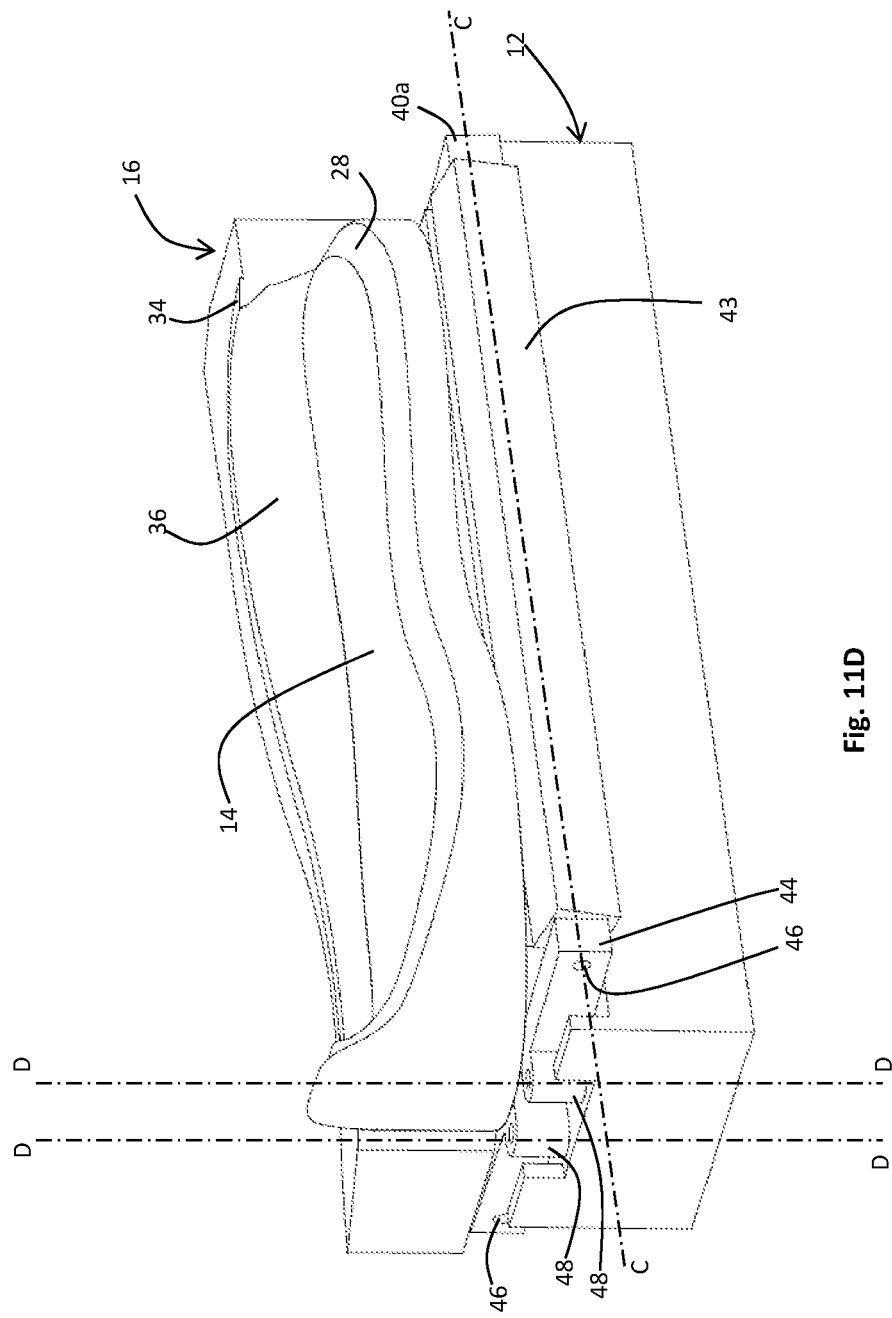
FIG. 11D is a simplified perspective view of the components of the mould shown in FIGS. 10A and 11A, in which one of the two first half-rings has been removed.

In accordance with the embodiment shown in FIGS. 10A-10C, 11A-11D, 12A-12F, the guiding means 24 of each first half-ring 16 comprise a pivoting appendage 44 and a first pivoting hinge 46, the axis of rotation of which coincides with the axis of rotation C (see FIG. 11D).

The pivoting appendage 44 is arranged in a position opposite to that of the guiding appendage 40. Advantageously, as shown in FIG. 11D, each first half-ring 16 may be provided with a rear guiding appendage 40a and a front pivoting appendage 44.

Preferably each first half-ring 16 may be pivotably mounted at the bottom on said pivoting appendage 44 by means of the hinge 46.

Advantageously, each hinge 46 connects rotatably the pivoting appendage 40 to the bottom appendage 43 of each half-ring 16.

The hinge 46, in combination with the hinge 42 provided in the rear guiding appendage 40a, allows the first half-ring 16 to rotate about the axis of rotation C.

Advantageously, this pivoting appendage 44 is, in turn, rotatably pivoted on the base 12 by means of a second pivoting hinge 48 designed to allow the rotation of the appendage 44 and the first half-ring 16 about a pivoting axis D (see FIG. 11D). Advantageously, this pivoting axis D is orthogonal to the axis of rotation C. Preferably the pivoting axis D is vertical and the axis of rotation C is horizontal.

Owing to this arrangement of the pivoting appendages 44, each half-ring 16 may therefore rotate, with respect to the base 12, about a vertical pivoting axis D.

Figure 12D:
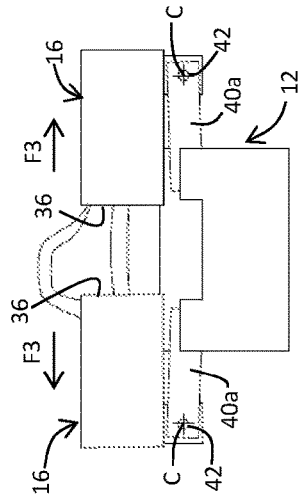
FIGS. 12D, 12E and 12F show respectively rear views of FIGS. 12A, 12B and 12C.
Figure 12E:
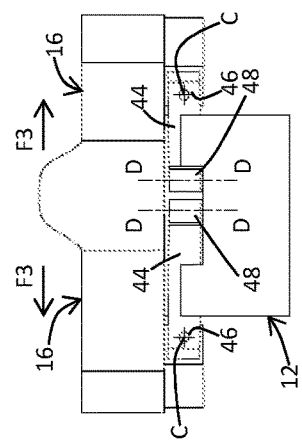
Figure 12F:
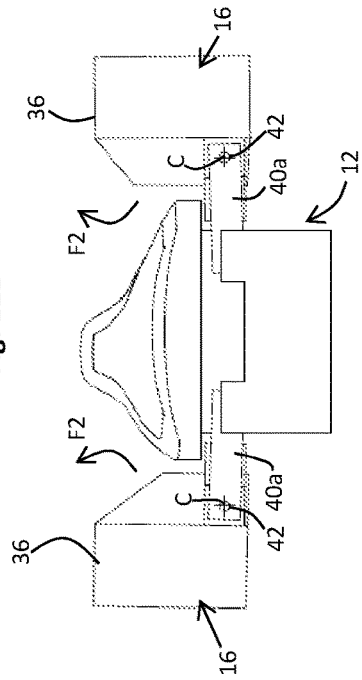
Figure 12A:
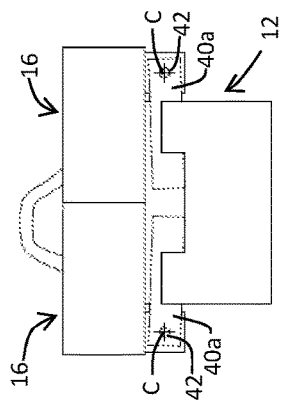
FIGS. 12A, 12B and 12C show respectively front views of FIGS. 11A, 11B and 11C.
Figure 12B:
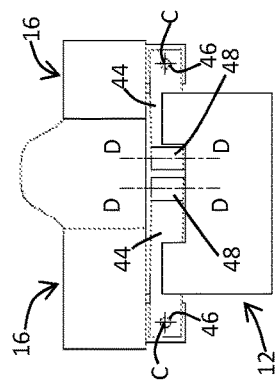
Figure 12C:
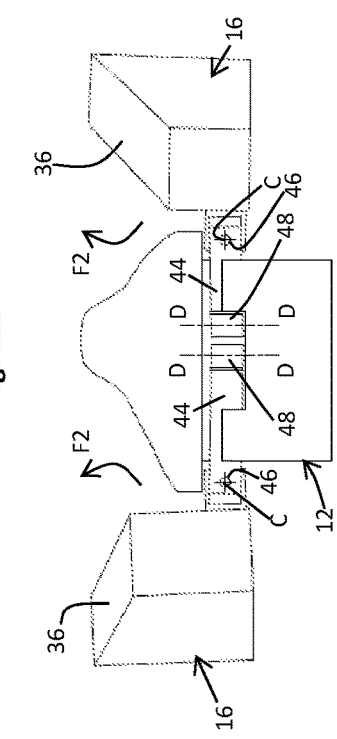

This rotation is schematically indicated by the arrows F3 in FIGS. 10B, 12B, 12E.

During this rotation, the rear guiding appendages 40 slide, moving away from each other, inside the corresponding guide grooves 26 which, in this case, extend preferably along a curved surface or have a cross-section greater than the cross-section of the guiding appendages.

In this way, following rotation about the vertical pivoting axis D, the two first half-rings may be moved from a configuration in which they are arranged close to the base (see FIGS. 10A, 11A and 11A) to a configuration in which they are spaced apart from each other (see FIGS. 10B, 11B, 12B and 12E).

Then, following rotation about the horizontal axis of rotation C, the two half-rings may move from a plane in which they are substantially parallel to the support plane of the base 12 to a plane which is inclined or vertical with respect to the plane supporting the base 12, such that the latter may become completely accessible for the mould operator (see FIGS. 10C, 11C, 12C and 12F).

Advantageously the combination of movements described above has the effect that, in the configuration where the two first half-rings 16 are arranged along a plane inclined or vertical with respect to the base, they are relatively close thereto, without hindering for this the loading of the tread 5 inside the impression 14 or the removal of the shoe 1 from the mould 10.

The two first half-rings 20 are also mounted on the mould-holder drawer of the mould-holder station.

As clearly shown in FIGS. 7, 8, 9 and 9a, each second half-ring 20 preferably has a top closing edge 52 designed to abut against the sides of the upper 2, which is mounted on the mould last 22, and a lateral impression 54, which has dimensions and a finish corresponding to half of the second layer 7 of the midsole 4.

As shown in FIGS. 9 and 9a, when they are arranged close together, the two half-rings 20 are designed to enclose, at least partially, inside them the two first half-rings 16, so that the bottom surface of each half-ring 20 may abut against the perimeter edge 34 of the first underlying half-ring 16.

In the case where the base is moved using a double upward movement, the two half-rings 20 will abut against the perimeter edge 34 of the corresponding first half-rings 16 once the base 12 has moved up to the end of its second movement.

In this way the second mould cavity 15, which is formed for moulding of the second layer 7 of the midsole 4, is delimited at the bottom by the base 12, laterally by the two first half-rings 16, inside which the assembly formed by the tread 5 and the first layer 6 of the midsole is housed, and by the second half-rings 20, and at the top by the upper 2 mounted on the mould last 22.

In a known manner, a first injection channel 56 and a second injection channel 57 may be arranged at the contact surface between the two second half-rings 20 (see FIG. 9).

Preferably the first injection channel 56 is positioned at a lower height than the second injection channel 57.

The injection holes of the respective injection channels are preferably aligned along a vertical axis.

Advantageously the two injection channels 56 and 57 are inclined. Preferably they extend along two converging planes.

As will be described in detail below, the first injection channel 56 and the second injection channel 57 may be used to inject respectively a first and a second polymeric mixture inside the mould 10.

Advantageously, the two second half-rings 20 may be moved by means of known linear actuators arranged in the mould-holder drawer of the moulding station.

Although intended to enclose at least partially the first half-rings 16, owing to the innovative movements of the latter relative to the base, in order to allow access to the base 12 an extra opening travel movement of the second half-rings 20 or modification of the dimensions of the mould-holder drawer is not necessary.

The lid 18 and the mould last 22 are in a known manner intended to be mounted in a position 180° opposite each other, on the last support assembly of the mould-holder station. Usually this last support assembly is rotatable through 360°, about its transverse axis, so as to arrange the lid 18 and the mould last 22 alternately facing the base 12, as required.

The present invention also relates to a method for manufacturing footwear by direct injection onto an upper. Advantageously this method may be performed by means of the mould 10 described above.

Advantageously, the mould 10 according to the invention allows a vertical double movement of the base 12, a so-called double wedge upward movement, to be used. As will appear clearly from the description below, this vertical movement allows the injection holes of the mould to be closed, once the first and second polymeric mixtures have been injected, therefore allowing footwear without any injection sprue marks to be obtained.

In particular the method according to the invention comprises the following steps:
providing the mould 10, comprising the base 12, the pair of first half-rings 16, the lid 18, the pair of second half-rings 20 and the mould last 22, in the open configuration;
positioning the first half-rings 16 such that they abut against the base 12 and are arranged close to the lid 18, so as to assume a first intermediate configuration;
closing the second half-rings 20 so that they abut against the lid 18, so as to define with the base 12 and the first half-rings 16 a first intermediate mould cavity 17;
injecting a first polymeric mixture inside said first intermediate mould cavity 17;
moving the base 12 and the first half-rings 16 towards the lid 18 so that they abut against the lid 18, so as to define the first mould cavity 13 for forming the first layer 6 of the midsole 4;
moving the base 12 and the first half-rings 16 away from the lid 18;
closing the second half-rings 20 so that they enclose the first half-rings 16 and abut against the upper 2 fitted onto the mould last 22, so as to define with the base 12 and the first half-rings 16 a second intermediate mould cavity 21;
injecting a second polymeric mixture inside said second intermediate mould cavity 21;
moving the base 12 and the first half-rings 16 towards the second half-rings 20 so that the first half-rings 16 abut against the second half-rings 20, so as to define the second mould cavity 15 for forming the second layer 7 of the midsole 4;
opening the second half-rings 20;
opening the first half-rings 16;
removing the shoe 1 from the mould last 22.

Preferably, before closing the first half-rings 16, a tread 5, moulded in a mould separately, may be loaded into the impression 14 of the base 12.

Reference will be made below to FIGS. 16-30, in order to illustrate in detail the various steps of said first method according to the invention.

FIGS. 16-30 show the embodiment of the mould 10 in which the guiding means 24 comprise a rear guiding appendage 40a and a front guiding appendage 44 (see FIGS. 10A-10C) and in which the second half-rings 20 are provided with two injection channels 56 and 57.

The same comments are applicable to the case where the method is implemented by means of the embodiment of the mould 10 in which the guiding means 24 comprise a rear guiding appendage 40b and a front guiding appendage 40a (see FIGS. 13A-13C).

It is assumed moreover that the lid 18 and the mould last 22 are mounted, in a position 180° opposite each other, on the last support assembly of the mould-holder station and that the last support assembly may be rotated 360° about its transverse axis.

Starting from the configuration in which the two first half-rings 16 are arranged close together and abut against the base 12 and in which the second half-rings 20 are spaced from each other, an operator may, manually or by means of suitable actuators, move the first half-rings 16 in the ways described above.

In detail, the first half-rings 16 are firstly separated by causing them to rotate about the vertical pivoting axis D so that the guiding appendage 40 slides inside the corresponding guide 26 in a direction parallel to the plane of the base 12.

Then the half-rings 16 are rotated about the horizontal axis of rotation C. This second rotation is indicated schematically in FIG. 16 by the arrows F2.

Figure 16:
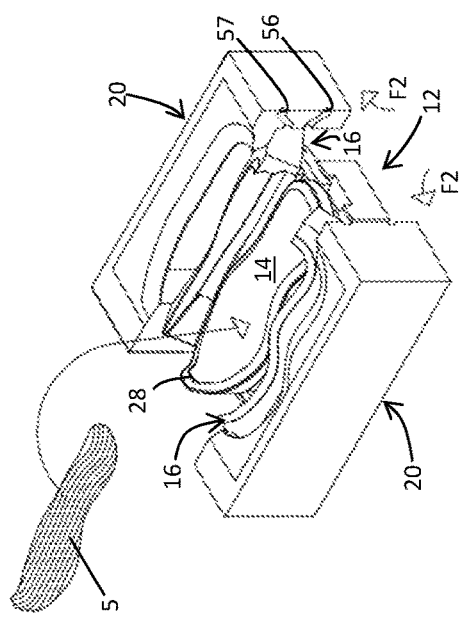

As already mentioned, the combination of a movement along a plane parallel to the support plane of the base 12 and a rotation about the axis of rotation C, parallel to the support plane of the base 12, ensures that the impression 14 of the base 12 is completely accessible even if the half-rings 16 are relatively close to the base 12 (see FIG. 16).

Figure 17:
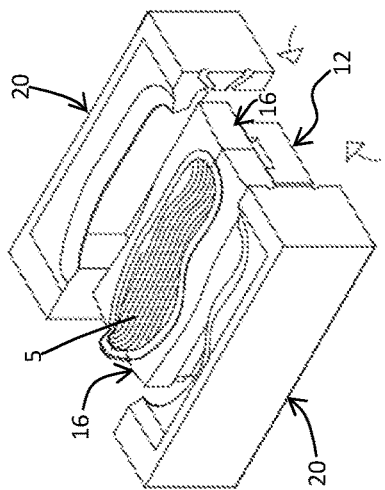
FIGS. 16-26 show schematically a number of steps of an embodiment of the method according to the invention.

As shown in FIG. 16, the tread 5 may then be loaded inside the impression 14 of the base 12 and the half-rings 16 are arranged close together, performing in a reverse order the movements described in the preceding step, so as to abut against the base 12 (see FIG. 17).

Figure 19:
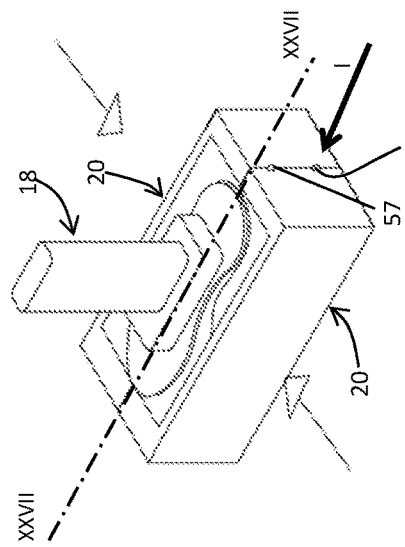
Figure 18:
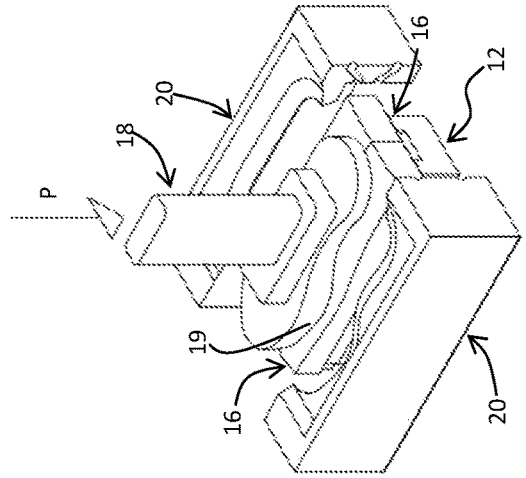

Then the lid 18 is moved towards the first half-rings 16 along the vertical direction P and the two second half-rings 20 are arranged close together (see FIGS. 18 and 19).

Figure 27:
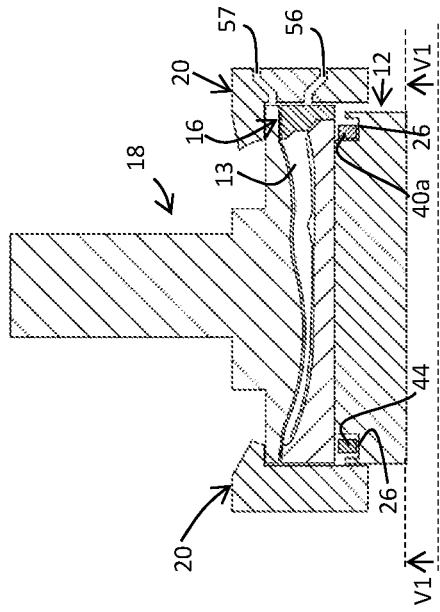
FIG. 27 shows a schematic cross-sectional view of the mould according to FIG. 19 along the plane indicated by XXVII-XXVII.

In detail, the two second half-rings 20 are arranged close together such that they abut with their bottom closing edge against the sides 19 of the lid 18, so as to define a first intermediate mould cavity 17 (see FIGS. 19 and 27).

Advantageously, as can be clearly seen in FIG. 27, in this mould configuration the perimeter edge of the lid 18 closes the second injection channel 57 provided in the second half-rings 20.

The first intermediate mould cavity 17 is defined at the bottom by the base 12, laterally by the first half-rings 16 and by the second half-rings 20 and at the top by the lid 18.

Then a first polymeric mixture is injected inside this first intermediate mould cavity 17 via the first injection channel 56 of the second half-rings 20. This first injection is schematically indicated by the arrow I in FIGS. 19 and 27.

Figure 28:
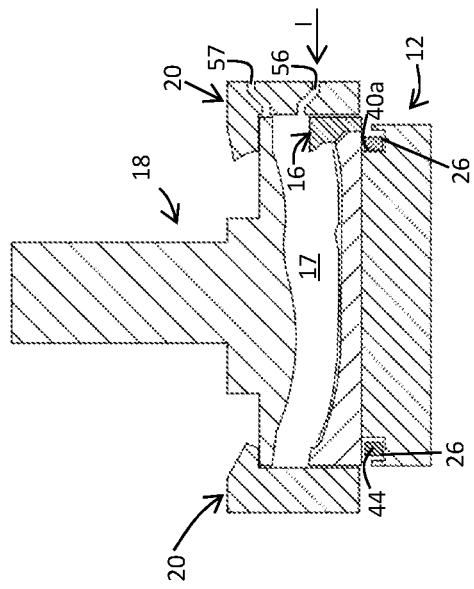
FIG. 28 is a view similar to that of FIG. 27, but showing a successive step of the method according to the invention.

Thereafter the base 12 and the first half-rings 16 are moved towards the lid 18, by means of a first vertical movement of the base 12, such that the first half-rings 16 abut against the lid 18, so as to define the first mould cavity 13 for forming the first layer 6 of the midsole (see FIG. 28).

The vertical movement of the base 12 and the first half-rings 16 (schematically indicated by the arrows V1 in FIG. 28) allows equalization of the moulding burr which will be formed along the closing surfaces between the first half-rings 16 and the lid 18.

Moreover, advantageously the first injection channel 56 may be closed before the polymeric mixture injected inside the first mould cavity has solidified. In this way, no trace of the injection point remains on the outer surface of the first layer 6 of the midsole 4, once moulding has been completed.

Then the two half-rings 20 are moved away from each other, while the first half-rings 16, arranged close together and abutting against the base 12, are moved away from the lid 18.

Figure 21:
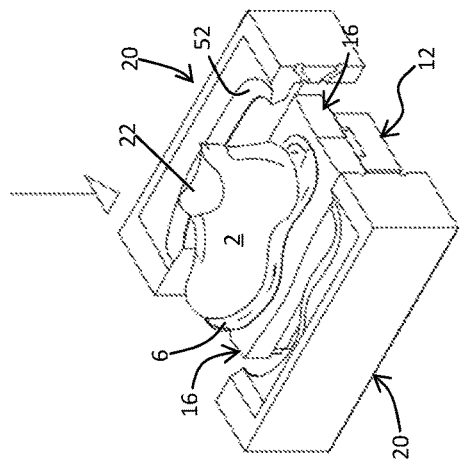
Figure 23:
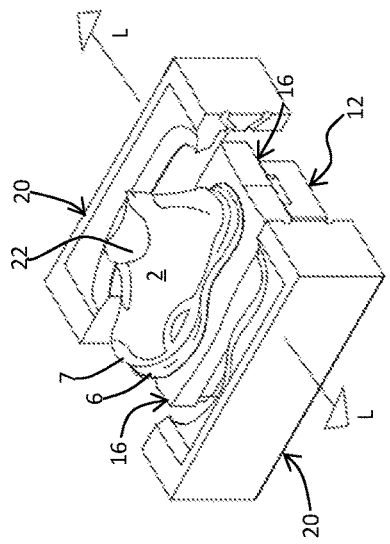
Figure 20:
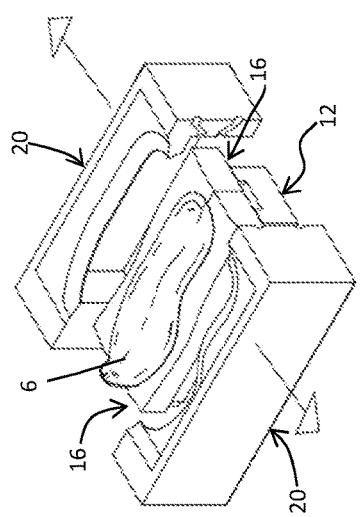

The lid 18, following a rotation of the last support assembly through 180°, is replaced by the mould last 22 on which the upper 2 is fitted (see FIGS. 20 and 21).

Then the second half-rings 20 are arranged close together such they enclose the first half-rings 16 and abut with their top edge 52 against the sides of the upper 2 (see FIGS. 22 and 29), so as to define a second intermediate mould cavity 21. The closing movement of the second half-rings 20 is schematically indicated by the arrows G in FIG. 22.

Advantageously, in this mould configuration the perimeter edge of the first half-rings 16 closes the first injection channel 56 of the second half-rings 20.

The second intermediate mould cavity 21 is defined at the bottom by the base 12, laterally by the first half-rings 16 and by the second half-rings 20 and at the top by the upper 2 mounted on the mould last 22.

A second polymeric mixture is injected inside this second intermediate mould cavity 21 via the second injection channel 57 of the second half-rings 20.

Figure 22:
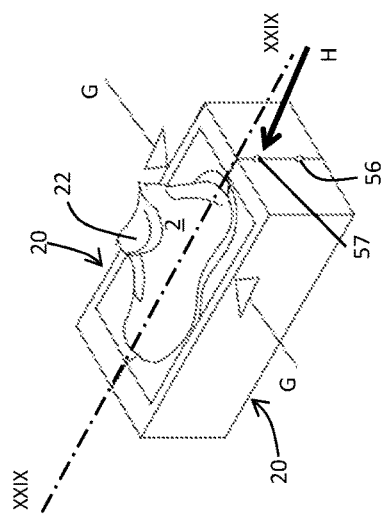
Figure 29:
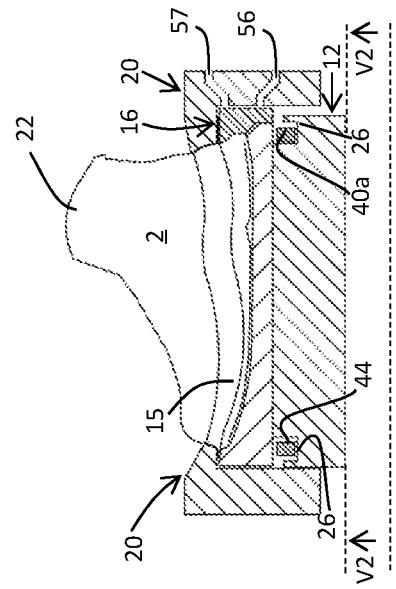
FIG. 29 shows a schematic cross-sectional view of the mould according to FIG. 22 along the plane indicated by XXIX-XXIX.

This second injection is schematically indicated by the arrow H in FIGS. 22 and 29.

Figure 30:
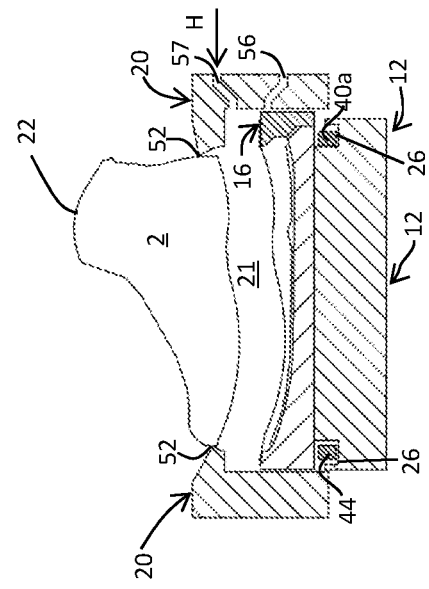
FIG. 30 is a view similar to that of FIG. 29, but showing a successive step of the method according to the invention.

Then the base 12 and the first half-rings 16 are moved towards the second half-rings 20, by means of a second vertical movement of the base 12, such that the first half-rings 16 abut against the second half-rings 20, so as to define the second mould cavity 15 for forming the second layer 7 of the midsole (see FIG. 30).

The second vertical movement of the base 12 and the first half-rings 16 (schematically indicated by the arrows V2 in FIG. 30) allows equalization of the moulding burr which will be formed along the closing surfaces between the first half-rings 16 and the second half-rings 20.

Moreover, advantageously the second injection channel 57 may be closed before the polymeric mixture injected inside the second mould cavity has solidified. In this way, no trace of the injection point remains also on the outer surface of the second layer 7 of the midsole 4, once moulding has been completed.

During the subsequent step, once the demoulding time of the second polymeric mixture injected has lapsed, the two second half-rings 20 are moved away from each other. This movement is schematically indicated by the arrows L in FIG. 23.

Then the two first half-rings 16 are firstly separated, causing them to rotate about the vertical pivoting axis D and are then rotated about the horizontal axis of rotation C.

Figure 25:
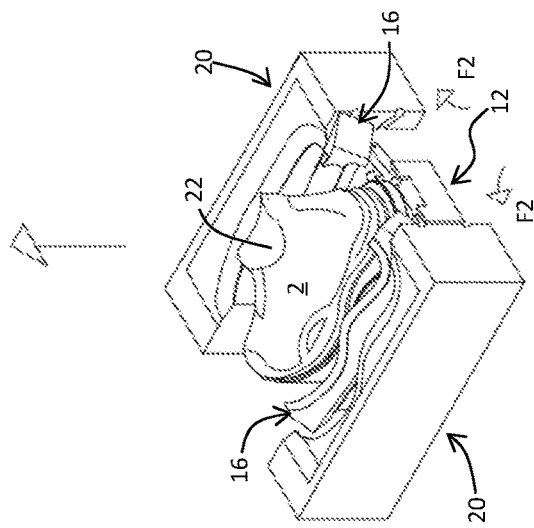
Figure 24:
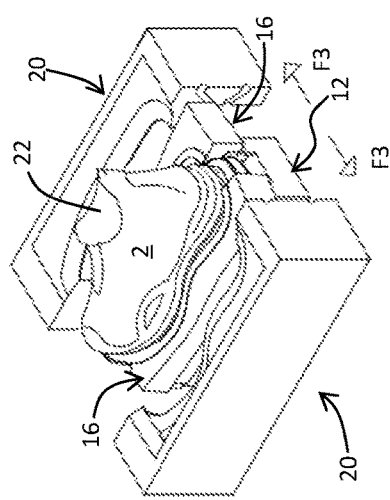
Figure 26:
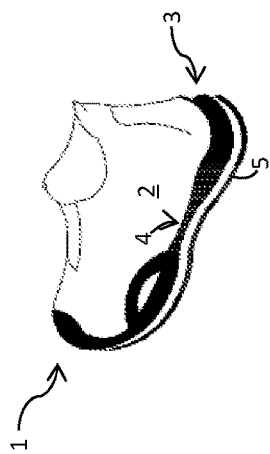

The first rotation and the second rotation are schematically indicated respectively by the arrows F3 and F2 in FIGS. 24 and 25.

These rotations allow the two first half-rings 16 to be moved away from each other, therefore allowing extraction of the sole, and therefore the shoe, from the base 12. At the same time these movements are not hindered by the presence of the two second half-rings 20.

The shoe thus obtained may be removed from the mould last 22 (see FIG. 26) and undergo the usual finishing operations.

From that described above it is clear how, with the mould and the method according to the present invention, the predefined object and tasks may be achieved.

The mould and the method according to the invention may be used and implemented in combination with moulding machines of the conventional type, without requiring structural modifications or particular adjustments.

Moreover, the mould and the method according to the invention are able to achieve a reduction in the production time, therefore resulting in increased productivity.

Furthermore, with the mould and the method according to the invention it is possible to obtain footwear with an attractive appearance, in which both the first layer and the second layer of the midsole are free of any marks left by the injection channel.

The person skilled in the art, in order to satisfy specific needs, may make modifications to the embodiments described above and/or replace the elements described with equivalent elements, without thereby departing from the scope of the attached claims.

For example, the hinges of the guiding means 24 may be replaced by equivalent fastening means designed to allow rotation as a single degree of freedom.

The first half-rings 16, differently from that shown, may be pivotably mounted on the base at a rear end thereof.

The two first half-rings 16 may have a different number of guiding appendices from that shown in the figures. These guiding appendages may also be positioned in different positions, for example in a middle position.

The invention claimed is:

1. A mould for producing a shoe by direct injection molding a sole onto an upper, wherein the sole comprises, a tread and a midsole, wherein the midsole is composed of a first layer and a second layer;

the mould comprising a base, a pair of first half-rings, a lid, a pair of second half-rings and a mould last, wherein the first half-rings are designed to be arranged close together such that they abut against the base and against the lid, so as to define a first mould cavity for moulding the first layer of the midsole, and wherein, while the first half-rings are abutting against the base, the second half-rings are designed to be arranged close together, such that they lie over the first half-rings and abut against the upper, fitted onto the mould last, so as to define a second mould cavity for moulding the second layer of the midsole;

the mould being characterized in that the first half-rings are provided with guiding means, designed to slidably engage with corresponding guiding means provided in the base, so as to allow the first half-rings to be moved away from and towards each other, the first half-rings being hinged at the bottom with said guiding means so as to be able to rotate about an axis of rotation.

2. The mould according to claim 1, characterized in that the guiding means of each first half-ring slide inside the guiding means of the base remaining in a horizontal plane, substantially parallel to the base, and in that said axis of rotation is a horizontal rotation axis.

3. The mould according to claim 1, characterized in that the guiding means of each first half-ring comprise at least a guiding appendage and a hinge, the axis of rotation of which coincides with said axis of rotation;

each half-ring being hinged at the bottom with said at least one guiding appendage by means of the hinge.

4. The mould according to claim 3, characterized in that each first half-ring is provided with a rear guiding appendage.

5. The mould according to claim 3, characterized in that each first half-ring is provided with a rear guiding appendage and with a front guiding appendage.

6. The mould according to claim 3, characterized in that the guiding means of each first half-ring comprise at least one pivoting appendage and a first pivoting hinge, the axis of rotation of which coincides with the axis of rotation;

each first half-ring being pivotably mounted at the bottom on said at least one pivoting appendage by means of the first pivoting hinge.

7. The mould according to claim 6, characterized in that said pivoting appendage is rotatably pivoted with the base by means of a second pivoting hinge designed to allow the pivoting appendage and the corresponding first half-ring to rotate about a pivoting axis perpendicular to the axis of rotation.

8. The mould according to claim 1, characterized in that the base comprises spacing means designed to exert a thrusting action against a facing surface of a first half-ring, when said first half-ring abuts against the base.

9. The mould according to claim 1, characterized in that the base is provided with an impression intended to house the tread of the sole.

10. The mould according to claim 1, characterized in that, when the two first half-rings are arranged close together and abut against the lid, a bottom closing edge of each first half-ring is designed to abut against a perimeter edge of the base;

the first mould cavity being delimited at the bottom by the base, laterally by the two first half-rings and at the top by the lid.

11. The mould according to claim 1, characterized in that, when the two second half-rings are arranged close together and abut against the upper, the bottom surface of each half-ring is designed to abut against a top perimeter edge of the underlying first half-ring;

the second mould cavity being delimited at the bottom by the base, laterally by the two first half-rings and by the second half-rings and at the top by the upper mounted on the mould last.

12. The mould according to claim 1, characterized in that a first injection channel and a second injection channel are provided at a contact surface between the two second half-rings;

the first injection channel being positioned at a lower height than the second injection channel.

13. A method of manufacturing a shoe by direct injection molding a sole onto an upper, wherein the sole comprises, a tread and a midsole, wherein the midsole is composed of a first layer and a second layer;

the method comprising the following steps:
providing a mould according to claim 1;
positioning the first half-rings so as to abut against the base and be arranged close to the lid, in order to adopt a first intermediate configuration;
closing the second half-rings so as to abut against the lid, in order to define a first intermediate mould cavity with the base and the first half-rings;
injecting a first polymeric mixture inside said first intermediate mould cavity;
moving the base and the first half-rings towards the lid so as to abut against the lid, in order to define the first mould cavity for forming the first layer of the midsole;
moving the base and the first half-rings away from the lid;
closing the second half-rings so that they enclose the first half-rings and abut against the upper fitted onto the mould last, in order to define a second intermediate mould cavity with the base and the first half-rings;
injecting a second polymeric mixture inside said second intermediate mould cavity;
moving the base and the first half-rings towards the second half-rings so that the first half-rings abut against the second half-rings, in order to define the second mould cavity for forming the second layer of the midsole;
opening the second half-rings;
opening the first half-rings;
removing the shoe from the mould last.

14. The method according to claim 13, characterized in that a first injection channel and a second injection channel are provided at a contact surface between the two second half-rings;

the first injection channel being positioned at a lower height than then second injection channel, the first polymeric mixture being injected inside the first intermediate mould cavity by means of the first injection channel.

15. The method according to claim 14, characterized in that the second polymeric mixture is injected inside the second intermediate mould cavity by means of the second injection channel.

16. The method according to claim 14, characterized in that, in the mould configuration where the first intermediate mould cavity is defined, a perimeter edge of the lid closes the second injection channel.

17. The method according to claim 16, characterized in that, in the mould configuration where the first mould cavity is defined, following the movement of the first half-rings and the base towards the lid, the first injection channel is closed; the second injection channel being closed by the lid.

18. The method according to claim 14, characterized in that, in the mould configuration where a second intermediate mould cavity is defined, a perimeter edge of the first half-rings closes the first injection channel.

19. The method according to claim 18, characterized in that, with the first injection channel closed, following the movement of the first half-rings and the base towards the second half-rings so as to define the second mould cavity, the second injection channel is closed.

20. The method according to claim 13, characterized in that the tread is loaded into an impression of the base before the first half-rings abut against the base.

* * * * *